Jan. 27, 1925.  
W. T. SEARS  
1,524,527  
TOOL FLOODING MECHANISM  
Filed Aug. 4, 1922

INVENTOR.  
W. T. Sears.  
BY  
ATTORNEY.

Patented Jan. 27, 1925.

1,524,527

UNITED STATES PATENT OFFICE.

WILLARD T. SEARS, OF MONTCLAIR, NEW JERSEY, ASSIGNOR TO NILES-BEMENT-POND COMPANY, OF NEW YORK, N. Y., A CORPORATION OF NEW JERSEY.

TOOL-FLOODING MECHANISM.

Application filed August 4, 1922. Serial No. 579,760.

*To all whom it may concern:*

Be it known that I, WILLARD T. SEARS, a citizen of the United States, residing at Montclair, in the county of Essex and State of New Jersey, have invented certain new and useful Improvements in Tool-Flooding Mechanism, of which the following is a specification.

This invention relates particularly to metal working machines, such as milling, grinding, etc., machines, wherein is provided a reciprocating work support, and the primary object of the invention is to provide such a machine with means including a fluid-containing reservoir for flooding or submerging the tool and work with a cutting fluid or lubricant at the will of the operator.

Another object of the invention is to provide in a machine of the class described, a box-like reciprocating work support and means including a reservoir and a communication between the reservoir and support for submerging the work engaging portion of the tool preparatory to a cutting operation and for draining the work support after the cutting operation preparatory to removing the finished work therefrom.

With the above and other objects in view, my invention consists in the features of construction and operation set forth in the following specification and illustrated in the accompanying drawing. In such drawing annexed hereto and forming a part of this specification, I have shown my invention embodied in a milling machine, but it will be understood that the invention can be otherwise embodied and that the drawing is not to be construed as defining or limiting the scope of the invention, the claims appended to this specification being relied upon for that purpose.

Referring to the figures of the drawing.

Figure 1:
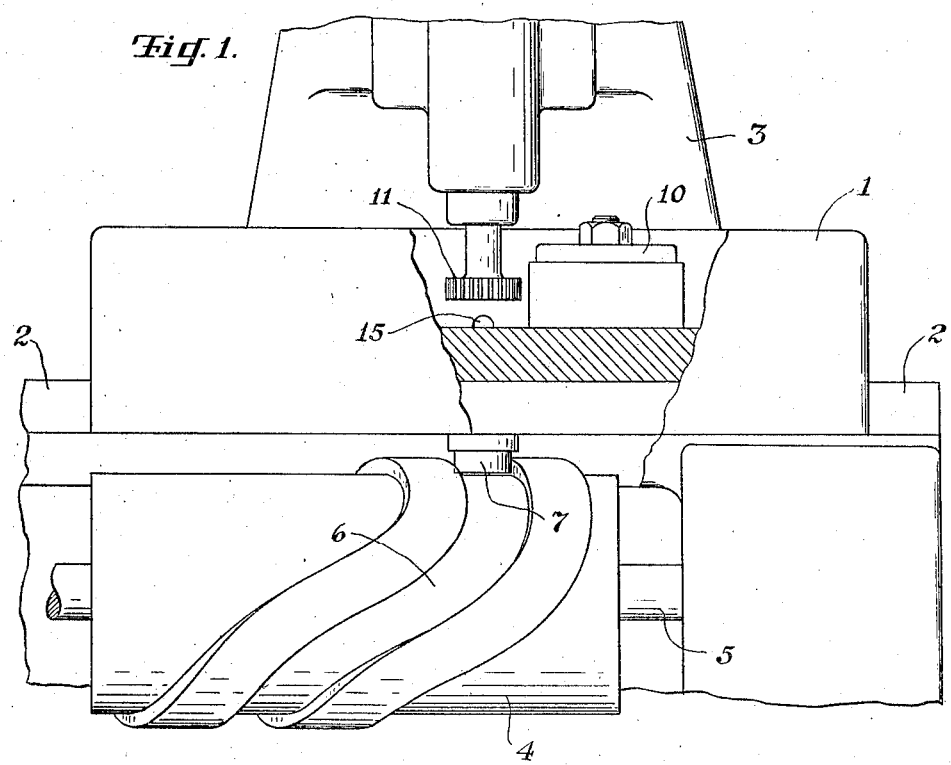
Figure 1 is a fragmentary front elevation of a milling machine having the present invention embodied therein.
Figure 2:
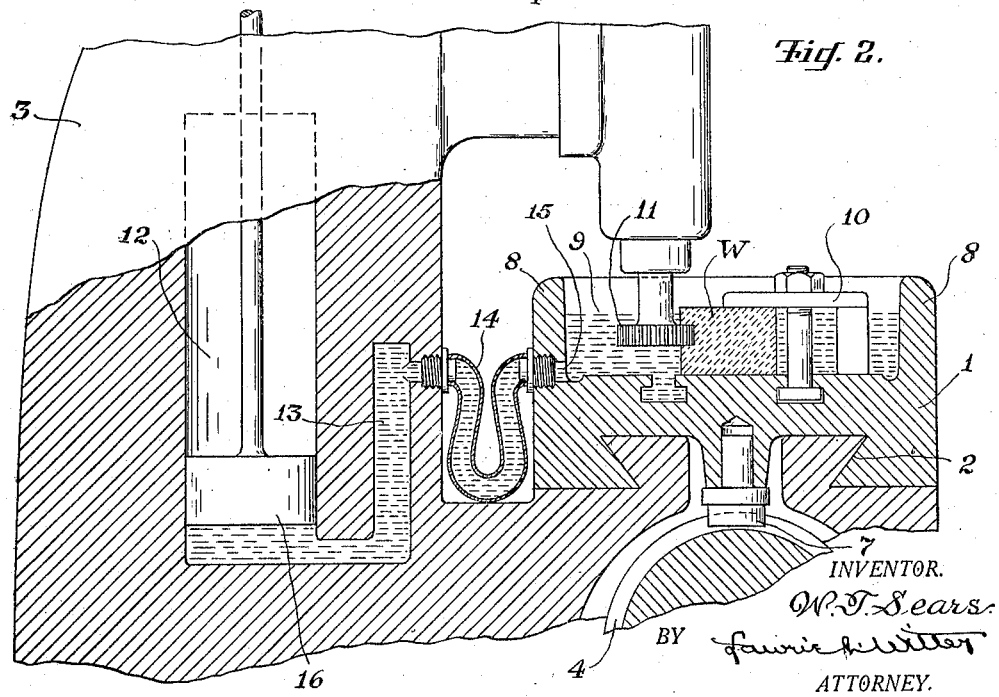
Fig. 2 is a vertical cross sectional view thereof.

It is well known that certain machining operations can best be performed while the tool is either partially or wholly submerged in a cutting fluid. Such fluid dissipates the heat from the tool and work and serves to lubricate the same in the cutting operation.
The present invention aims to provide a mechanism particularly adapted to perform this operation with ease and facility. The specific means illustrated in the drawing for carrying the invention into practice will now be described.

In the drawing, I have illustrated a work support 1 as mounted for reciprocation on ways 2 of a milling machine 3. The work support or slide may be reciprocated in any manner desired, for example, as by a cam drum 4 on a rotary shaft 5. The cam drum has a peripheral cam groove 6 receiving a depending stud 7 on the work support whereby to effect a complete reciprocation of the slide for each rotation of the drum.

The work support is preferably box-like in form as illustrated whereby the work W is surrounded by an enclosing wall 8 forming a tank or basin 9. The work is secured to the table by means of a clamp 10 and is adapted to be operated upon by the milling tool 11 illustrated. The main object of the invention is to provide means whereby this operation may be performed under oil or other cutting fluid. For accomplishing this object, I provide means for raising the oil level in the work support, such means preferably including an oil well or reservoir in communication with the basin 9. In the drawing, I have preferred to illustrate this reservoir as being in a stationary part of the machine adjacent the work support.

An oil reservoir or well 12 is formed in a portion of the frame 3 of the machine and is illustrated as having communication with the basin 9 through an opening 13 and a flexible tube 14, the tube 14 having its ends respectively secured to the frame 3 and slide 1 in communication with openings 13 and 15 thereof. A piston 16 is provided in the reservoir for forcing the fluid through the tube into the tank or basin of the work support. This piston may be operated by any convenient means.

In operation, the work piece W will preferably be secured to the support before flooding the same. In this manner, the piece may be accurately mounted on the support in the usual way. The piston 16 is thereafter forced downwardly and the oil in the basin raised to the level desired. This level should be high enough to cover at least the operating portion of the tool. The work table 1 is thereafter reciprocated in the usual manner to mill the work piece as illustrated, it being understood, of course, that the flexible tube 14 permits of such reciprocation. Before removing the finished work and mounting a rough piece in its stead, the operator may, by raising the piston 16, lower the oil level in the basin sufficiently to permit easy and accurate changing of the work.

What I claim is:

1. In a machine of the class described, the combination of a work support provided with a liquid-containing basin, means for reciprocating the same, means for supporting a tool in position to operate on work on the support, a liquid-containing reservoir, and means for flooding the basin from the reservoir to submerge the work engaging portion of the tool.

2. In a machine of the class described, the combination of a base, a work support thereon, means for reciprocating the support, means for supporting a tool in position to operate on work on the support, a reservoir in the base, and means operative in the reservoir for submerging the work engaging portion of the tool from the reservoir.

3. In a machine of the class described, the combination of a base, a work support thereon, means for reciprocating the support, means for supporting a tool in position to operate on work on the support, a reservoir in the base, and means comprising a substantially vertically extending piston operative in the reservoir for submerging the work engaging portion of the tool from the reservoir.

4. In a machine of the class described, the combination of a box-like work support, means for reciprocating the same, means for supporting a tool in position to operate on work on the support, a reservoir outside of but adjacent the work support, means providing a communication between the reservoir and the work support, and means for submerging the tool from the reservoir through the said communication.

5. In a machine of the class described, the combination of a box-like work support, means for reciprocating the same, means for supporting a tool in position to operate on work on the support, a reservoir, a flexible tube providing a communication between the reservoir and the work support, and means for submerging the tool from the reservoir through the said tube.

In testimony whereof, I hereto affix my signature.

WILLARD T. SEARS.